United States Patent [19]

Coleman

[11] Patent Number: 4,627,634
[45] Date of Patent: Dec. 9, 1986

[54] SIDE VISION AID FOR TRAILER HITCHING

[76] Inventor: Gary W. Coleman, Coleman Mobile Home Park, 8615 So. Highway 89, No. 16, Willard, Utah 84340

[21] Appl. No.: 772,042

[22] Filed: Sep. 3, 1985

[51] Int. Cl.[4] .................................... B60Q 1/00
[52] U.S. Cl. .................................. 280/477; 33/264
[58] Field of Search ................ 280/477; 33/264; 116/28 R; 248/206.3, 206.4

[56] References Cited

U.S. PATENT DOCUMENTS

| | | | |
|---|---|---|---|
| 2,984,011 | 5/1961 | Hamilton | 33/264 |
| 3,893,068 | 7/1975 | Tucker | 33/264 X |
| 3,901,536 | 8/1975 | Black | 280/477 |

FOREIGN PATENT DOCUMENTS

| | | | |
|---|---|---|---|
| 1029685 | 5/1958 | Fed. Rep. of Germany | 280/477 |
| 2069430 | 8/1981 | United Kingdom | 280/477 |

*Primary Examiner*—John A. Pekar
*Attorney, Agent, or Firm*—A. Ray Osburn

[57] ABSTRACT

A visual aid device for positioning of a towing vehicle for hitching to a trailer. A vehicle-attachable sighting rod assembly co-operates with a trailer sighting target assembly to guide the vehicle rearwardly into hitching position. Sighting and target rods are so placed as to come together when the vehicle reaches the hitching position. The sighting rod may be attached to be visible along the side of the vehicle, so that an unobstructed rear window is not needed. The target rod is then placed upon the ground to the side of the trailer coupling the same distance that the vehicle sighting rod is from the vehicle coupling. The target assembly may also have another sighting rod, which with the target rod is useful for vehicle direction control, if needed. The assemblies may also be used with the rear window, if it is not visually obstructed. In this case, the target assembly then being attached to the trailer tongue with the target rod rising vertically directly from the coupling to be seen through the window.

14 Claims, 14 Drawing Figures

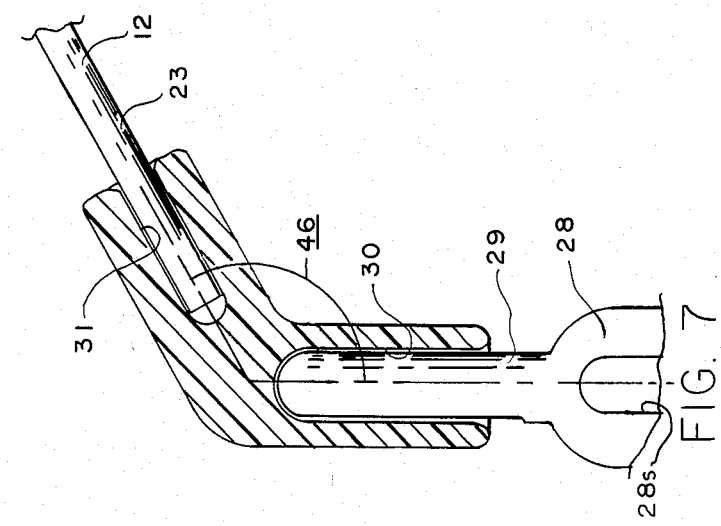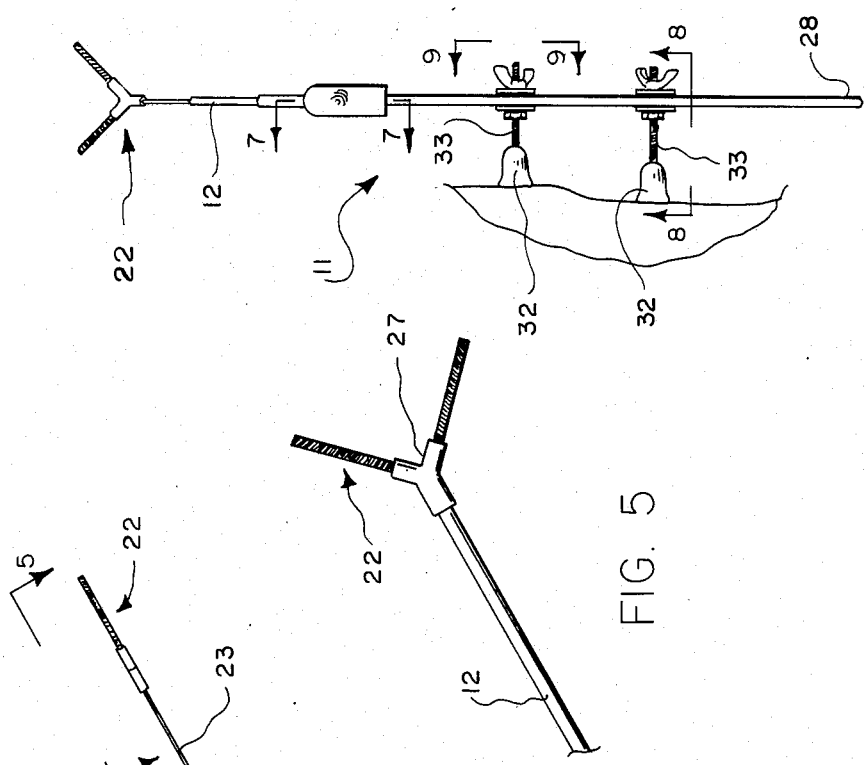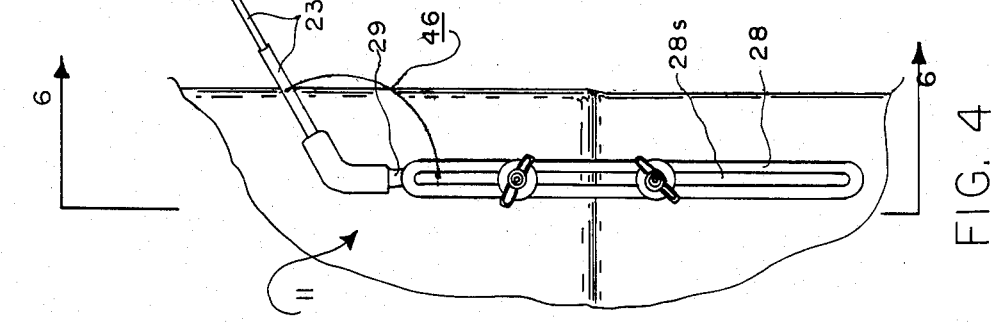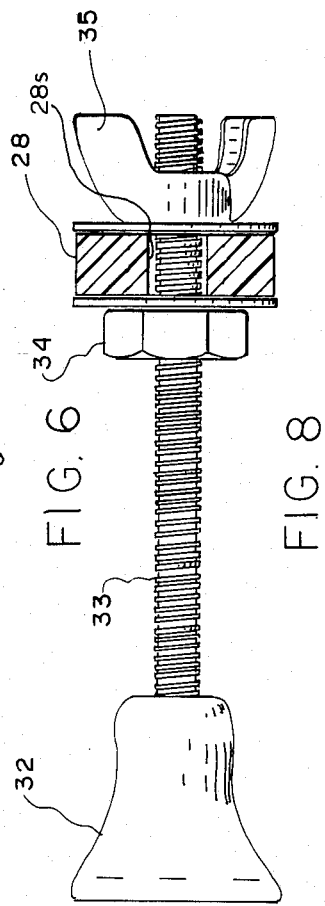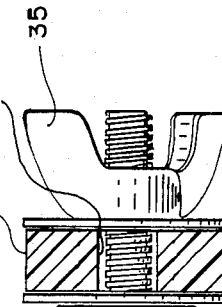

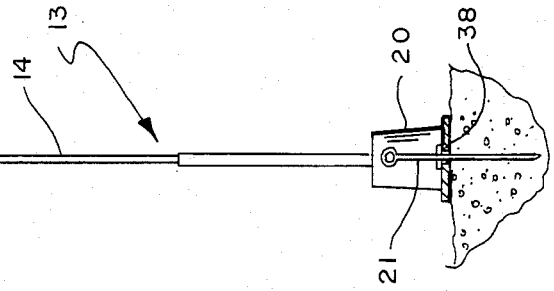
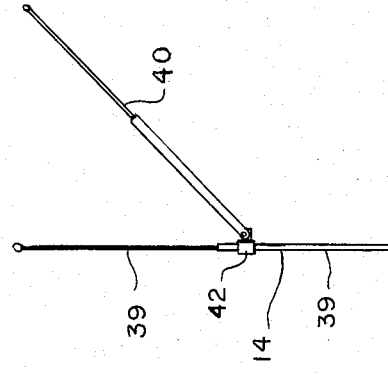
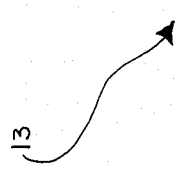
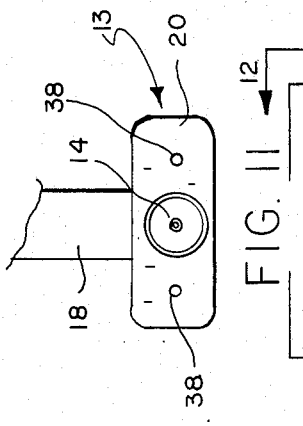
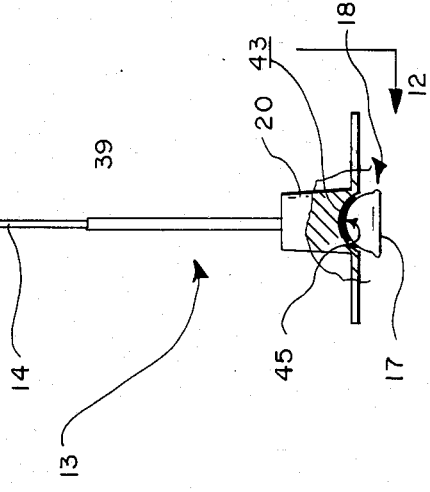
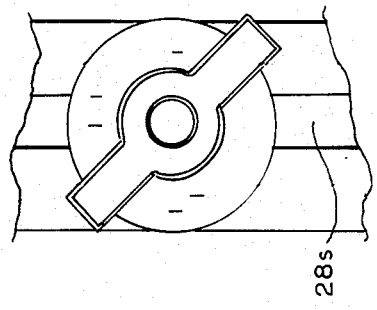

SIDE VISION AID FOR TRAILER HITCHING

BACKGROUND OF THE INVENTION

1. Field: The field of the invention is visual aids for positioning towing vehicles for engagement of the hitch with a trailer.

2. Prior Art: Hitches for connecting towing vehicles with trailers typically include a coupling ball upon the vehicle and a mating socket upon a forward projecting tongue of the trailer, both centrally located at bumper level obscured from direct view by the vehicle operator. Hookup requires much trial and error maneuvering, the unaided operator necessarily dismounting repeatedly to check the ball position relative to the socket. Damage to the vehicle or trailer is a real possibility with such blind maneuvering. Many sighting devices have been put forth to solve this problem. Each involves a pair of co-operating visual aids, one secured to the trailer and the other to the towing vehicle, so that alignment of the hitch components may be made by maneuvering of the vehicle from the driver's seat. Representative of these are U.S. Pat. Nos. 3,918,746, 4,285,138 and 4,065,147. Some of the sighting aids are rigidly attached to vehicle or trailer, easily damaged during the vehicle maneuvering for hitching, although some are removably attached with magnets or the like. Some include plumb bobs for precise positioning, for example, perhaps with pivotable sighting rods or the like. Some have built-in illumination. Thus, most of the sighting devices are either impractical, easily damaged beyond use, or are prohibitively expensive. However, all of the sighting aids share a much more serious shortcoming, in that all require vision through the rear window of the towing vehicle, either by way of the inside rear view mirror or by direct sight by the vehicle operator. Many trailer towing vehicles do not provide this unobstructed rear window vision, even if kept uncurtained or uncluttered. Vans often have solid doors in the rear. Some have paired rear doors with opaque edges at the center of the vehicle where vision is needed. In any event, clouding or fouling of the window glass is common. Some hitching assemblies have complicated self-guiding features permitting less precise vehicle positioning (U.S. Pat. Nos. 2,197,157 and 2,844,390). Others have electronic sensors and signal transmitters for blind coupling (U.S. Pat. Nos. 4,432,563 and 4,187,494). There is thus a definite need for a trailer hitching aid which is useful for vehicles without unobstructed rear windows, and which does not require expensive and vulnerable hitching assemblies or electronic apparatus.

BRIEF SUMMARY OF THE INVENTION

With the foregoing in mind, the disadvantages and shortcomings in the prior art trailer coupling aids are eliminated or substantially alleviated in the present invention, which enables the vehicle operator to position the towing vehicle for hitching it to a trailer when unobstructed vision is available through the vehicle rear window, and also when such vision is not available. A pair of co-operating assemblies are provided, adapted to be used together in either case to guide the vehicle into hitching position with the trailer. One of the assemblies has a sighting rod and is removably attachable to the vehicle to place the rod in view selectively either through the rear window or along the driver's side of the vehicle. The other assembly has a target rod, and may be selectively attached to the trailer coupling with the target rod upstanding to be visible through the rear window, or erected upon the ground to be visible along the operator's side of the vehicle.

For the side view use, the vehicle-attached assembly is located so that the sighting end of the sighting rod may be placed longitudinally even with the vehicle coupling. The trailer target assembly is placed on the ground so that the target rod is longitudinally even with the trailer coupling, but displaced laterally the same amount as the sighting end of the sighting rod.

According to one embodiment of the invention, the trailer sighting assembly incorporates an auxiliary target rod spaced apart from the target rod. The assembly then may be rotationally oriented so that the two rods indicate a direction parallel to the trailer. The operator is thus able to more accurately align the towing vehicle with the trailer, for improved alignment of ball and socket.

Preferably, the sighting rod, the target rod, and the directional reference rod if used, are constructed fo telescoping sections, both for storage and for position adjustment for hitching. The vehicle sighting assembly may comprise an elongate rod-holding member to one end of which the sighting rod is adjustably pivotally attached at an angle, along with suction cups with adjustable-length stems so that the member may be attached to the vehicle vertically oriented for improved sighting accuracy. The sighting rod is angled from the supporting member, so that it extends rearwardly to the proper position relative to the ball, and upwardly to be visible to the operator. The target sighting assembly may comprise an elongate rod, preferably of telescoped construction, affixed to an enlarged base for resting upon the ground. The base may also comprise, for example, "VELCRO" strips or other means for removable attachment to the tongue of the trailer directly above the coupling socket.

It is therefore a principal object of the invention to provide an efficient, easily used trailer hitching aid, adaptable for use both with and without unobstructed vision through the rear window of the towing vehicle. It is a further object to provide such a device which is not easily damageable in the hitching process, and which does not require electronic sensors or the like.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
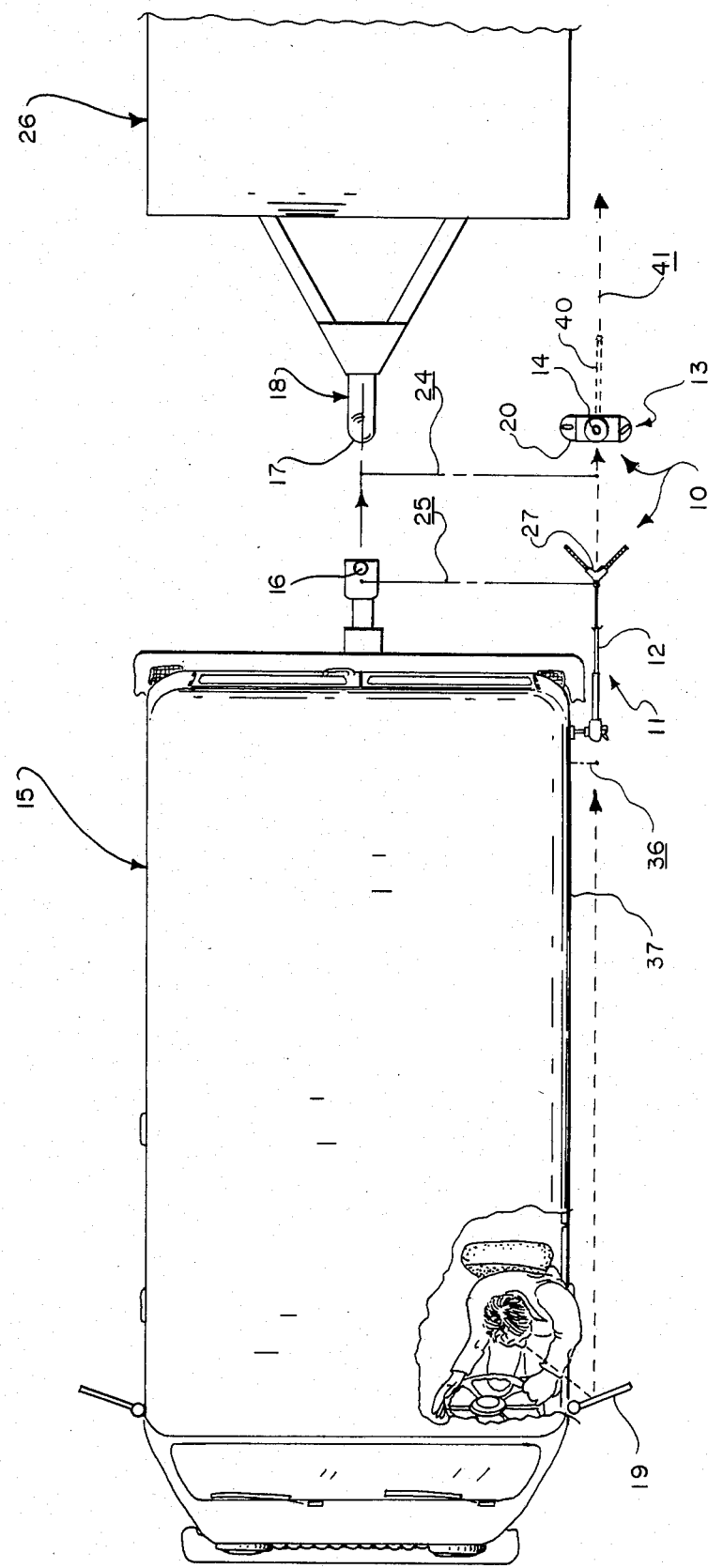
FIG. 1 is an upper plan view of the side vision aid for trailer hitching in use, showing a towing vehicle being maneuvered into hitching position with a trailer, drawn to a reduced scale, FIG. 2 a side perspective view of the hitching aid, vehicle and trailer of FIG. 1 in position for coupling, drawn to the scale of FIG. 1, FIG. 3 a perspective view of the trailer hitching aid of FIG. 1 in use with a vehicle with an unobstructed rear window, drawn to the scale of FIG. 1, FIG. 4 a side elevation view of the vehicle sighting assembly of the trailer hitching aid of FIG. 1, along with a fragment of the vehicle, drawn to a larger scale than FIG. 1, FIG. 5 a view of a fragment of the sighting rod of the sighting assembly of FIG. 4, taken along line 5—5 thereof, drawn to a larger scale than that of FIG. 4, FIG. 6 a side elevation view of the sighting assembly of FIG. 4, taken along line 6—6 thereof, drawn to the same scale, FIG. 7 a vertical cross sectional view of a fragment of the sighting assembly of FIG. 6, taken along line 7—7 thereof, drawn to substantially full scale, FIG. 8 a cross sectional view of the sighting assembly of FIG. 6, taken along line 8—8 thereof, drawn to substantially full scale, FIG. 9 an elevation view of a fragment of the sighting assembly of FIG. 6, taken along line 9—9 thereof, drawn to substantially full scale, FIG. 10 an elevation view of the trailer target assembly of the hitching aid of FIG. 3, taken along line 10—10 thereof, partially cut away, drawn to a slightly larger scale, FIG. 11 a top plan view of the trailer target assembly of FIG. 10, taken along line 11—11 thereof, drawn to the same scale, FIG. 12 a side elevation view of the trailer target assembly of FIG. 10, taken along line 12—12 thereof, drawn to the same scale, FIG. 13 a side elevation view of the trailer target assembly of FIG. 2, partially cut away, drawn to the scale of FIG. 12, and FIG. 14 a side elevation view of a fragment of another embodiment of the trailer target assembly of the side vision hitching aid of FIG. 1, showing an auxiliary, pivotally attached, trailer-direction-indicating target rod, drawn to the approximate scale of FIG. 13.
Figure 2:
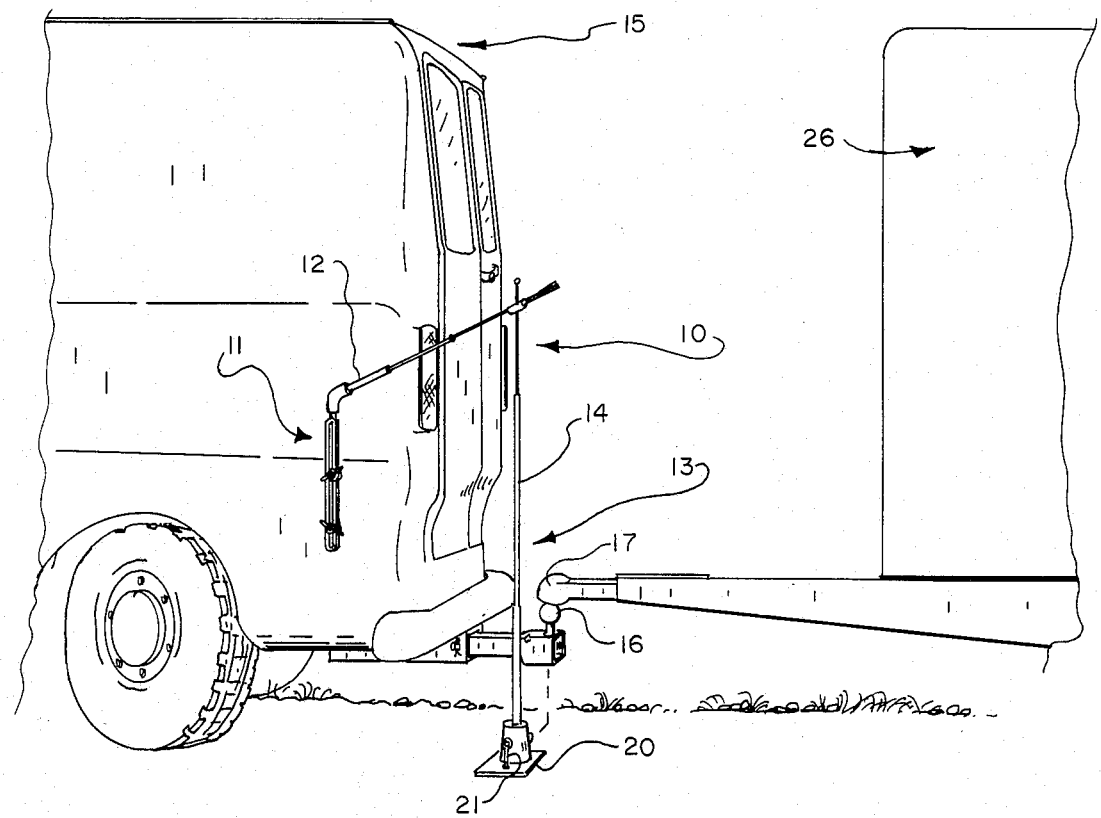

The trailer hitching aid 10 comprises a vehicle-attachable sighting assembly 11 having a sighting rod 12, and a trailer sighting target assembly 13 including a target rod 14. (FIG. 1) Sighting rod 12 and target rod 14 together indicate a direction of rearward travel for towing vehicle 15 to place coupling ball 16 into position to be connected with the mating trailer coupling socket 17 at the end of tongue 18. Vehicle sighting assembly 11 is attached in position for sighting rod 12 to be visible by the operator along the side of vehicle 15, either directly or by way of side rear view mirror 19. Trailer target rod assembly 13 is placed upon the ground with base 20, secured if necessary by pins 21, holding target rod 14 vertical. "Y"-shaped sighting end 22 of sighting rod 12 is adjusted as by telescoping tubes 23 until it is aligned with vehicle hitch ball 16 transversely to vehicle 15. Trailer target rod 14 is similarly placed with respect to trailer coupling socket 17 at a distance 24 equal to the distance 25 of "Y" 22 from coupling ball 16. Vehicle 15 is then backed directly toward trailer 26 until the root 27 of "Y" 22 meets upstanding target rod 14, placing coupling ball 16 directly below coupling socket 17 for ready connection (FIG. 2)

To support sighting rod 14, sighting assembly 11 provides a slotted bar 28 terminating at one end with a cylindrical stud 29. An angled connector 29c joins with rod 14 and with stud 29 through a bore 30 sized for movable frictional fit. Sighting rod 12 is secured within another bore 31. A pair of suction cups 32 are each secured to support bar 28 by a threaded stem 33 held adjustably within the slot 28s gripped between a threaded nut 34 and a threaded thumb nut 35. Sighting rod support bar 28 may thus be secured vertically for improved sighting accuracy. (FIG. 6) It may also be spaced adjustably outward on threaded stems 33 a distance 36 from the side 37 of vehicle 15 to assure that the operator's line of sight through "Y" 22 is parallel to the vehicle, further improving the accuracy of vehicle positioning. (FIGS. 4–9)

Trailer target assembly 13 comprises target rod 14 and enlarged base 20 to hold it vertical. Preferably, target assembly 13 is not solidly anchored, so that it will be toppled undamaged if inadvertently struck with excessive force. If needed to hold target rod 14 vertical on uneven ground, the pins 21 may be inserted into the ground through holes 38. Target rod 14 is advantageously used to measure distances 24 and 25, and may also be advantageously constructed of telescoping tubes 39 to facilitate storage.

Experience has shown that vehicle 15 may be easily aligned directionally with trailer 26 sufficiently accurately for hitching purposes. However, to preclude any directional alignment difficulty, an auxiliary vehicle alignment means, such as rod 40, may be provided. Then, target assembly 13 may be rotationally oriented to establish a reference line sight 41 parallel to trailer 26. Directional reference rod 40 may be retractably attached through a pivot assembly 42 to one of the telescoping members 39 of target rod 14. Rod 14 may also be of telescoping construction. (See FIG. 1 and FIG. 14)

Figure 3:
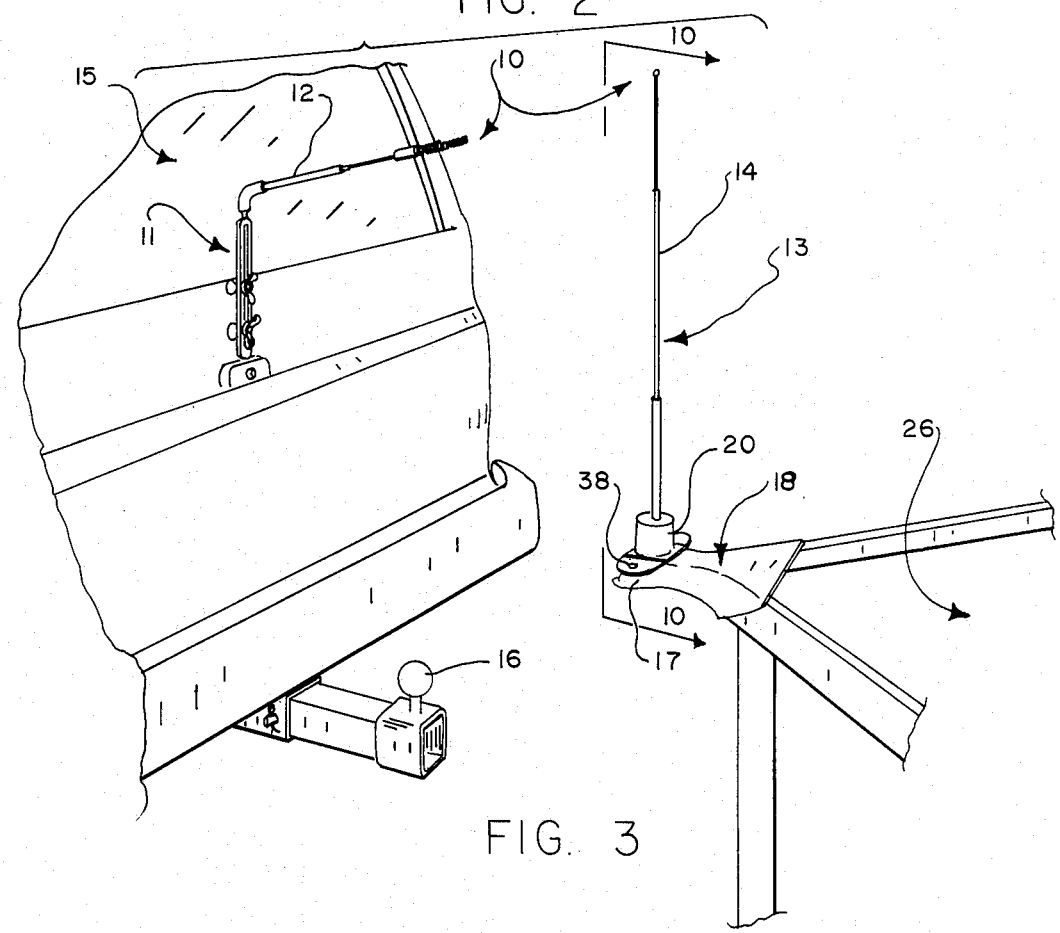

Hitching aid 10 may be used also in the manner of prior art hitching aid devices, providing that towing vehicle 15 has an unobstructed rear window. In anticipation of such application, base 20 of trailer target rod assembly 13 is adapted to be secured directly to the trailer hitch tongue 18. Concave, downwardly opening recess 43 generally accepts the convex top 44 of tongue 18 directly over socket 17. Opposed strips of hook and loop fabric ("VELCRO") 45, respectively secured as by adhesive to recess 43 and tongue 18, may be used, e.g., to support target assembly 13. Angle 46 of connector 29c is selected to be somewhat obtuse so that sighting rod 12 and "Y" 22 project upwardly, clearly visible through the rear window. For this application, connector 29c is rotated so that sighting rod 12 extends rearwardly to place "Y" 22 directly over coupling ball 16. (FIG. 3)

The invention may therefore be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. A towing vehicle positioning aid for joining a hitch coupling of the vehicle to a mating hitch coupling of a trailer, the positioning aid comprising:
    a sighting assembly having an elongate sighting rod with one end suitable for a sighting reference, along with means for removable attachment of the assembly to the vehicle body in selective location so that the sighting end may be transversely aligned with the hitch coupling of the towing vehicle and visible by the operator along the side of the vehicle; and
    a trailer target assembly including a target rod and means for support of the target assembly upon the ground with the target rod vertically upstanding.

2. The vehicle positioning aid of claim 1, wherein:
the sighting assembly attachment means is adapted also for removable attachment of the assembly to the vehicle so that the sighting end of the sighting rod may be placed directly above the hitch coupling of the vehicle and at a height to be visible to the operator through the rear window of the vehicle; and
the trailer target assembly support means is adapted also for removable attachment of the assembly to the hitch coupling of the trailer with the target rod vertically upstanding thereabove at least to the height of the sighting end of the sighting rod.

3. The vehicle positioning aid of claim 2, wherein:
the sighting assembly attachment means comprises suction cup means; and
the means for removable attachment of the target assembly to the trailer hitch coupling comprises a pair of opposed strips, one of hook material and one of loop material, one secured to the trailer coupling and the other to the bottom of the target rod support means.

4. The vehicle positioning aid of claim 3, wherein:
the sighting and target rods each comprise at least two slideably adjustable telescopic portions.

5. The vehicle positioning aid of claim 1, wherein:
the trailer target assembly further comprises a member attached thereto having at least a portion which may be positioned horizontally spaced substantially away from the vertically upstanding target rod.

6. The vehicle positioning aid of claim 5, wherein:
the sighting assembly attachment means comprises suction cup means.

7. The vehicle positioning aid of claim 1, wherein:
the sighting assembly attachment means comprises suction cup means.

8. A vehicle positioning aid for joining the hitch coupling of a towing vehicle to a mating hitch coupling of a trailer, the positioning aid comprising:
a sighting assembly having a base member with suction cup means for its attachment to the body of the vehicle at selective locations, a sighting rod having one end suitable for a sighting reference, and means securing the rod at its other end pivotally to the base member about an axis generally parallel to the adjacent side of the vehicle; and
a trailer target assembly having a target rod, a base, and means securing said rod to said base, said base being adapted to support the assembly upon the ground with the rod vertically upstanding therefrom.

9. The vehicle positioning aid of claim 8, wherein:
the base further comprises means for its removable attachment to the trailer hitch coupling with the target rod vertically upstanding directly thereabove.

10. The vehicle positioning aid of claim 9, the target rod assembly further comprising:
an auxiliary target rod secured to the target assembly, at least a portion of the auxiliary rod being spaced horizontally away from the vertical target rod so as to define therewith a line of sight visible to the vehicle operator.

11. The vehicle positioning aid of claim 8, the trailer target assembly further comprising:
an auxiliary target rod secured to the target assembly, at least a portion of the auxiliary rod being spaced horizontally away from the vertical target rod so as to define therewith a line of sight visible to the vehicle operator.

12. The vehicle positioning aid of claim 8, wherein:
the sighting and target rods each comprise at least two slideable adjustable telescopic portions; and
the auxiliary target rod comprises at least two slideably adjustable telescopic portions, and further comprises means for its adjustable pivotal securement to the trailer target rod assembly.

13. A vehicle positioning aid for joining the hitch coupling of a towing vehicle to a mating hitch coupling of a trailer, the positioning aid comprising:
a vehicle-attachable sighting assembly including a base member with an elongate slot therethrough, a pair of suction cups each mounted upon one of a pair of externally threaded elongate stems disposed through the slot, each stem carrying a pair of internally threaded nuts, one on each side of the base member; and a sighting rod of at least two slideably adjustable telescopic portions, a connector joining one end of said sighting rod to one end of said base member angularly thereto, said connector being adjustably pivotal about an axis generally parallel to the base member; and
a trailer target assembly having a target rod, a base, and means securing said rod to said base, said base being adapted to support the assembly upon the ground with the rod vertically upstanding therefrom, and means for its removable attachment to the trailer hitch coupling with the target rod vertically upstanding directly thereabove.

14. The vehicle positioning aid of claim 13, the trailer target assembly further comprising:
an auxiliary target rod secured to the target rod assembly, at least a portion of the auxiliary rod being spaced horizontally away from the vertical target rod so as to define therewith a line of sight visible to the vehicle operator.

* * * * *